United States Patent
Perrot et al.

(10) Patent No.: US 9,556,740 B2
(45) Date of Patent: Jan. 31, 2017

(54) TURBINE ENGINE BLADE, IN PARTICULAR FOR A ONE-PIECE BLADED DISK

(71) Applicant: SNECMA, Paris (FR)

(72) Inventors: Vincent Paul Gabriel Perrot, Maisons Alfort (FR); Damien Cellier, Paris (FR); Alicia Lise Julia Dufresne, Paris (FR); Philippe Pierre Marcel Marie Pelletrau, Vaux-le-Penil (FR); Jean-Francois Antoine Christian Rios, Nandy (FR); Laurent Christophe Francis Villaines, Vaux le Penil (FR)

(73) Assignee: SNECMA, Paris (FR)

( * ) Notice: Subject to any disclaimer, the term of this patent is extended or adjusted under 35 U.S.C. 154(b) by 426 days.

(21) Appl. No.: 14/361,594

(22) PCT Filed: Nov. 22, 2012

(86) PCT No.: PCT/FR2012/052695
§ 371 (c)(1),
(2) Date: May 29, 2014

(87) PCT Pub. No.: WO2013/079851
PCT Pub. Date: Jun. 6, 2013

(65) Prior Publication Data
US 2014/0341749 A1 Nov. 20, 2014

(30) Foreign Application Priority Data
Nov. 29, 2011 (FR) .................... 11 60893

(51) Int. Cl.
*F01D 5/14* (2006.01)
*F01D 5/34* (2006.01)
*F04D 29/32* (2006.01)

(52) U.S. Cl.
CPC ................ *F01D 5/141* (2013.01); *F01D 5/34* (2013.01); *F04D 29/324* (2013.01);
(Continued)

(58) Field of Classification Search
CPC .......... F01D 5/141; F01D 5/34; F04D 29/324; F04D 29/544; F04D 29/563; Y02T 50/673; F05D 2250/70; F05D 2240/242; F05D 2250/71; F05D 2220/3216; F05D 2240/303; F05D 2240/121; F05D 2220/3217
(Continued)

(56) References Cited

U.S. PATENT DOCUMENTS

| 6,328,533 B1 | 12/2001 | Decker |
| 2005/0031454 A1 | 2/2005 | Doloresco et al. |

(Continued)

FOREIGN PATENT DOCUMENTS

| EP | 1 111 188 | 6/2001 |
| EP | 1 505 302 | 2/2005 |

(Continued)

OTHER PUBLICATIONS

Smith, et al., "Sweep and Dihedral Effects in Axial-flow Turbomachinery", Journal of Basic Engineering, vol. 85, No. 3, pp. 401-416, Sep. 1, 1963, XP000560640.

(Continued)

*Primary Examiner* — Marina Tietjen
(74) *Attorney, Agent, or Firm* — Oblon, McClelland, Maier & Neustadt, L.L.P.

(57) ABSTRACT

A turbine engine blade comprising an airfoil extending axially between a leading edge and a trailing edge and extending radially between a root and a tip. The leading edge of the airfoil presents a sweep angle that is positive and that increases continuously from the root to a first radial height of the airfoil situated in the range 20% to 40% of the total radial height of the airfoil as measured from the root to the tip, and decreases continuously from this first radial height of the airfoil to the tip.

10 Claims, 1 Drawing Sheet

(52) U.S. Cl.
CPC ........... *F05D 2220/3216* (2013.01); *F05D 2240/242* (2013.01); *F05D 2240/303* (2013.01); *F05D 2250/70* (2013.01); *F05D 2250/71* (2013.01); *Y02T 50/673* (2013.01)

(58) Field of Classification Search
USPC ........ 416/223 R, 238, DIG. 2, 242, 243, 234
See application file for complete search history.

(56) References Cited

U.S. PATENT DOCUMENTS

| | | |
|---|---|---|
| 2007/0297904 A1 | 12/2007 | Hoeger |
| 2008/0148564 A1 | 6/2008 | Burton et al. |
| 2009/0123276 A1 | 5/2009 | Greim et al. |
| 2010/0054946 A1 | 3/2010 | Orosa et al. |
| 2010/0150729 A1 | 6/2010 | Kirchner et al. |
| 2012/0192421 A1 | 8/2012 | Kirchner et al. |
| 2013/0266451 A1 | 10/2013 | Pesteil et al. |

FOREIGN PATENT DOCUMENTS

| | | |
|---|---|---|
| EP | 1 939 399 | 7/2008 |
| EP | 2 199 543 | 6/2010 |

OTHER PUBLICATIONS

International Search Report Issued Mar. 19, 2013 in PCT/FR12/052695 Filed Nov. 22, 2012.
U.S. Appl. No. 14/348,770, filed Mar. 31, 2014, Merville, et al.

TURBINE ENGINE BLADE, IN PARTICULAR FOR A ONE-PIECE BLADED DISK

BACKGROUND OF THE INVENTION

The present invention relates to the general field of one-piece bladed disks for a turbine engine, and it relates more particularly to the profile of the blades included in such disks.

A one-piece bladed disk of a turbine engine (also known as a "blisk") designates a rotor in which the blades and the disk that carries them are machined directly in a single uniform block of metal so as to form one single piece. Such disks are generally used to form various compressor stages of the turbine engine, and in particular the high pressure compressor of an aviation turbojet of the two-spool bypass type.

The design of blisk blades needs to satisfy requirements both in terms of aerodynamic performance and in terms of mechanical strength in a particular environment. When such blades present a radial airfoil height that is relatively small, high-amplitude aerodynamic phenomena known as secondary flows are generated. These secondary flows contribute to reducing the aerodynamic performance of the blade. The aerodynamic flow behavior is also made difficult to control by the presence of a flow passage of the "plunging" type, i.e. a passage that is sloping towards the axis of rotation of the turbojet.

OBJECT AND SUMMARY OF THE INVENTION

It is therefore desirable to be able to have a blisk blade with an airfoil profile that makes it possible to achieve good control over the secondary flows and to take account of the blade being located in a "plunging" passage.

To this end, the invention provides a turbine engine blade comprising an airfoil extending axially between a leading edge and a trailing edge and extending radially between a root and a tip, in which, in accordance with the invention, the leading edge of the airfoil presents a sweep angle that is positive and that increases continuously from the root to a first radial height of the airfoil situated in the range 20% to 40% of the total radial height of the airfoil as measured from the root to the tip, and decreases continuously from this first radial height of the airfoil to the tip.

Such an airfoil profile makes it possible in particular to obtain a fluid flow distribution that favors the zone of the airfoil close to the root compared with the mid-height zone. Furthermore, the flow rate is sucked against the top portion of the flow passage. This results in optimizing the distribution of the fluid flow over the entire height of the flow passage, thereby improving the aerodynamic efficiency of the blade and contributing to controlling the secondary flows.

Preferably, the sweep angle of the leading edge of the airfoil becomes negative as from a second radial height of the airfoil situated in the range 60% to 80% of the total radial height of the airfoil.

Also preferably, the sweep angle of the leading edge of the airfoil is less than −45° at the tip of the airfoil.

According to an advantageous provision, the leading edge of the airfoil presents a dihedral angle that increases generally from the root to the tip. This dihedral angle of the leading edge of the airfoil may lie between a minimum value at the root lying in the range −25° to −5°, and a maximum value at the tip lying in the range +5° to +25°. Preferably, it lies in the range −15° at the root to +15° at the tip.

Furthermore, the dihedral angle of the leading edge of the airfoil is advantageously negative between the root and the first radial height of the airfoil, and positive between a third radial height of the airfoil situated in the range 40% to 60% of the total radial height of the airfoil and the tip. The presence of such a dihedral angle serves to provide incidence protection to the low portion of the airfoil (the leading edge is said to be "closed"), which is associated with a zone of static stress that is acceptable.

The third radial height of the airfoil is advantageously situated at 50% of the total radial height of the airfoil. Thus, the forces imparted by the blading to the fluid (and vice versa) are oriented optimally for guaranteeing static stress in the airfoil that is acceptable and a distribution of aerodynamic efficiency that is uniform.

The first radial height of the airfoil is preferably situated at 30% of the total radial height of the airfoil.

The invention also provides a one-piece bladed disk for a turbine engine having a plurality of blades as defined above. The invention also provides a turbine engine having at least one such one-piece bladed disk.

BRIEF DESCRIPTION OF THE DRAWING

Other characteristics and advantages of the present invention appear from the description made below with reference to the accompanying drawing which shows an embodiment having no limiting character. In the figures.

DETAILED DESCRIPTION OF THE INVENTION

The invention applies to any turbine engine blade.

Figure 1:
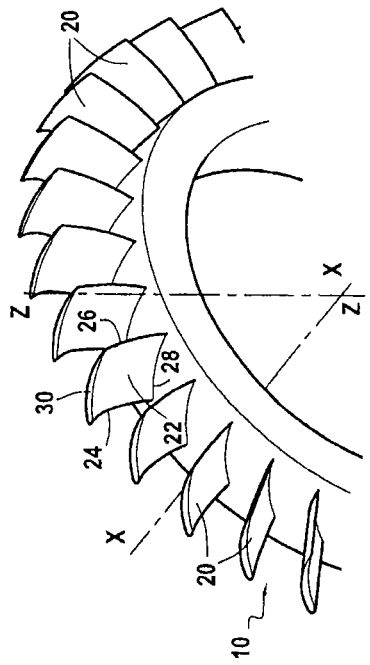
FIG. 1 is a fragmentary view in perspective of a one-piece bladed disk having blades of the invention.

The invention relates more particularly but not exclusively to the blades of a one-piece bladed disk for a turbine engine, such as a disk 10 of the downstream stages of a high pressure compressor in a turbojet, like the disk shown in FIG. 1. The blades 20 of such a disk have an airfoil of small radial height, e.g. a height of the order of 25 millimeters (mm), and they are positioned in a "plunging" flow passage, i.e. a passage that slopes towards the axis of rotation of the turbojet.

In known manner, each blade 20 comprises an airfoil 22 that extends axially (i.e. along the longitudinal axis X-X of the turbojet) between a leading edge 24 and a trailing edge 26, and that extends radially (i.e. along a radial axis Z-Z perpendicular to the longitudinal axis X-X) between a root 28 and a tip 30.

According to the invention, the leading edge 24 of the blade airfoil presents a sweep angle that is positive and that increases continuously from the root 28 to a first radial height $h_1$ along the airfoil lying in the range 20% to 40% of the total radial height of the airfoil as measured going from the root towards the tip, and that decreases continuously going from said first radial height $h_1$ of the airfoil to the tip 30.

By definition, the minimum radial height of the airfoil is equal to 0% and corresponds to the point of intersection between the leading edge of the airfoil with the bladed disk defining the inside of the flow passage for the air stream passing through the compressor stage. Likewise, the maximum radial height of the airfoil is equal to 100% and corresponds to the point where the leading edge line is at its radially highest point.

Furthermore, the sweep angle is the acute angle formed at a point of the leading edge of the blade between a tangent of the leading edge and a line perpendicular to the relative velocity vector. When the sweep angle is positive, it is said that the leading edge presents backward curvature (backward sweep), whereas a negative sweep angle indicates that the leading edge presents forward curvature (forward sweep).

A more precise definition of sweep angle is given in particular in the publication by Leroy H. Smith and Hsuan Yeh entitled "Sweep and dihedral effects in axial-flow turbomachinery" (published in the Journal of Basic Engineering, September 1963, p. 401).

Figure 2:
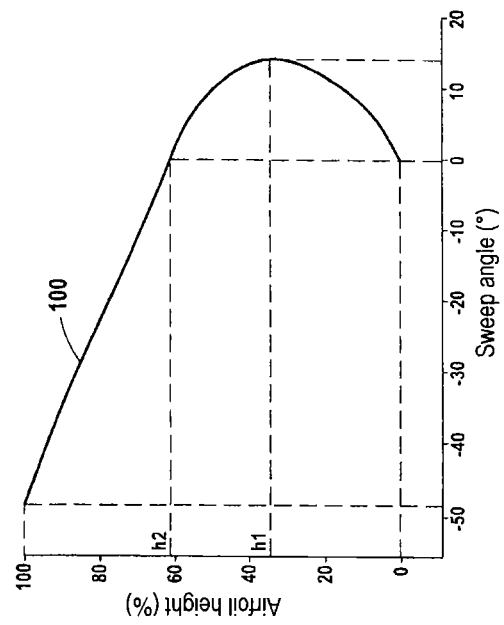
FIG. 2 plots a curve representative of the sweep angle of the leading edge of the airfoil of a blade in accordance with the invention.

The sweep angle of the leading edge of the airfoil of a blade in accordance with the invention is represented by curve 100 in FIG. 2. As shown by this curve 100, the sweep angle is positive (backward curvature) and increases continuously from the root (corresponding to an airfoil height of 0%) up to a first radial height $h_1$ of the airfoil situated in the range 20% to 40%—and preferably equal to 30%—of the total radial height of the airfoil measured from the root towards the tip. The sweep angle also decreases continuously from this first radial height $h_1$ of the airfoil to the tip (corresponding to an airfoil height of 100%).

The term "continuously" is used herein to mean that the increase (or decrease as the case may be) in the sweep angle is not interrupted between the two radial heights that define these portions of the leading edge. In particular, these portions of the leading edge do not contain any increase (or decrease as the case may be) of the sweep angle.

Preferably, the sweep angle of the leading edge of the airfoil becomes negative from a second radial height $h_2$ of the airfoil situated in the range 60% to 80% of the total radial height of the airfoil (in the example shown in FIG. 2, $h_2$=60%).

Also preferably, the sweep angle of the leading edge of the airfoil is less than −45° at the tip of the airfoil (in the example shown in FIG. 2, it is about −49° at an airfoil radial height of 100%, corresponding to the tip of the airfoil).

Such a relationship for the sweep angle of the leading edge of the airfoil together with the above-described particular features contributes mainly to distributing the flow of fluid over the full height of the passage and to aerodynamic stability at the opening of the radial clearance at the blade tip (which opening tends to enlarge as the engine ages).

Furthermore, the blade may present additional advantageous characteristics specified by a relationship for the dihedral angle of the leading edge of its airfoil.

The dihedral angle of the leading edge is the angle formed at a point on the leading edge of the blade between the tangent of the leading edge and a plane containing the axis of rotation of the blade. A negative dihedral angle means that the tangent at the point on the leading edge of the blade is directed in the direction of rotation of the blade. On the contrary, a positive dihedral angle means that the tangent at the point of the leading edge of the blade is directed in the direction opposite to the direction of rotation of the blade. A more precise definition of the dihedral angle is likewise given in the above-mentioned publication by Leroy H. Smith and Hsuan Yeh.

Figure 3:
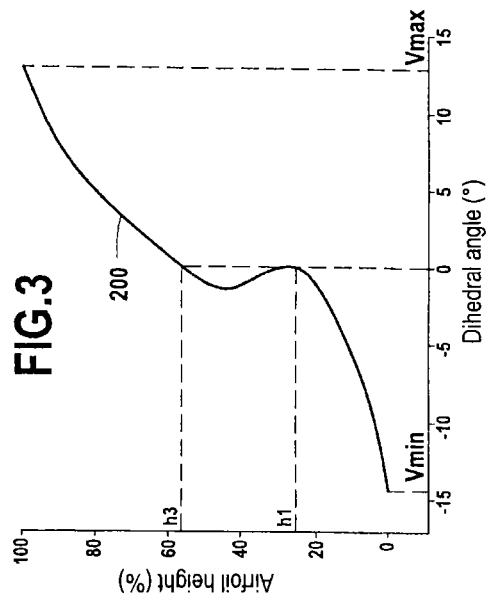
FIG. 3 plots a curve representing the dihedral angle of the leading edge of the airfoil of a blade in accordance with the invention.

The dihedral angle of the leading edge of the airfoil of the blade of the invention is represented by the curve 200 in FIG. 3. As shown by this curve 200, this dihedral angle increases generally from the root to the tip. In the example of FIG. 3, it thus passes from a value of −15° at the root (corresponding to an airfoil radial height of 0%), up to a value of +13° at the tip (corresponding to an airfoil radial height of 100%).

In contrast to increasing "continuously", a dihedral angle increasing "generally" may possibly present some decrease over certain portions of the leading edge lying between the root and the tip of the airfoil.

The dihedral angle of the leading edge of the airfoil preferably lies between a minimum value $V_{min}$ at the root lying in the range −25° to −5° and a maximum value $V_{max}$ at the tip lying in the range +5° to +25°. Preferably, the dihedral angle at the leading edge of the airfoil lies in the range −15° at the root to +15° at the tip.

Furthermore, the dihedral angle of the leading edge of the airfoil is advantageously negative between the root and the first radial height $h_1$ of the airfoil lying in the range 20% to 40%—and preferably equal to 30%—of the total radial height of the airfoil. Likewise, it is preferably positive between a third radial height $h_3$ of the airfoil lying in the range 40% to 60%—and preferably equal to 50%—of the total radial height of the airfoil and the tip of the airfoil.

The invention claimed is:

1. A turbine engine blade comprising an airfoil extending axially between a leading edge and a trailing edge and extending radially between a root and a tip, wherein the leading edge of the airfoil presents a sweep angle that is positive and that increases continuously from the root to a first radial height of the airfoil situated in a range 20% to 40% of a total radial height of the airfoil as measured from the root to the tip, and decreases continuously from this first radial height of the airfoil to the tip, wherein the sweep angle of the leading edge of the airfoil becomes negative as from a second radial height of the airfoil situated in a range 60% to 80% of the total radial height of the airfoil.

2. A blade according to claim 1, wherein the sweep angle of the leading edge of the airfoil is less than −45 at the tip of the airfoil.

3. A blade according to claim 1, wherein the leading edge of the airfoil presents a dihedral angle that increases generally from the root to the tip.

4. A blade according to claim 3, wherein the dihedral angle of the leading edge of the airfoil lies between a minimum value at the root lying in a range −25° to −5°, and a maximum value at the tip lying in a range +5° to +25°.

5. A blade according to claim 4, wherein the dihedral angle of the leading edge of the airfoil lies in a range 15° at the root to +15° at the tip.

6. A blade according to claim 3, wherein the dihedral angle of the leading edge of the airfoil is negative between the root and the first radial height of the airfoil, and positive between a third radial height of the airfoil situated in a range 40% to 60% of the total radial height of the airfoil and the tip.

7. A blade according to claim 6, wherein the third radial height of the airfoil is situated at 50% of the total radial height of the airfoil.

8. A blade according to claim 1, wherein the first radial height of the airfoil is situated at 30% of the total radial height of the airfoil.

9. A one-piece bladed disk for a turbine engine, comprising a plurality of blades according to claim 1.

10. A turbine engine, comprising at least one one-piece bladed disk according to claim 9.

* * * * *